United States Patent Office 3,716,312
Patented Feb. 13, 1973

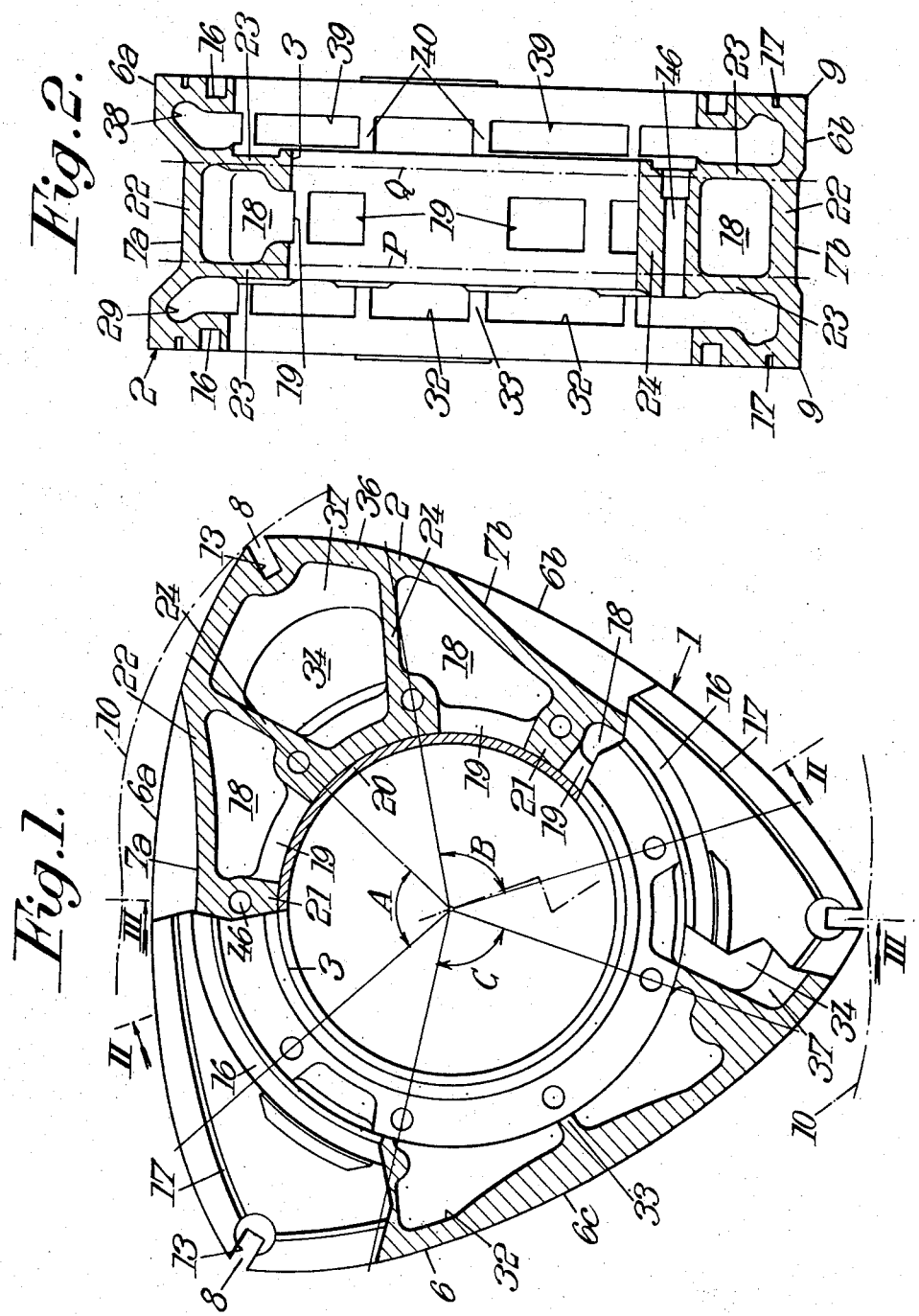

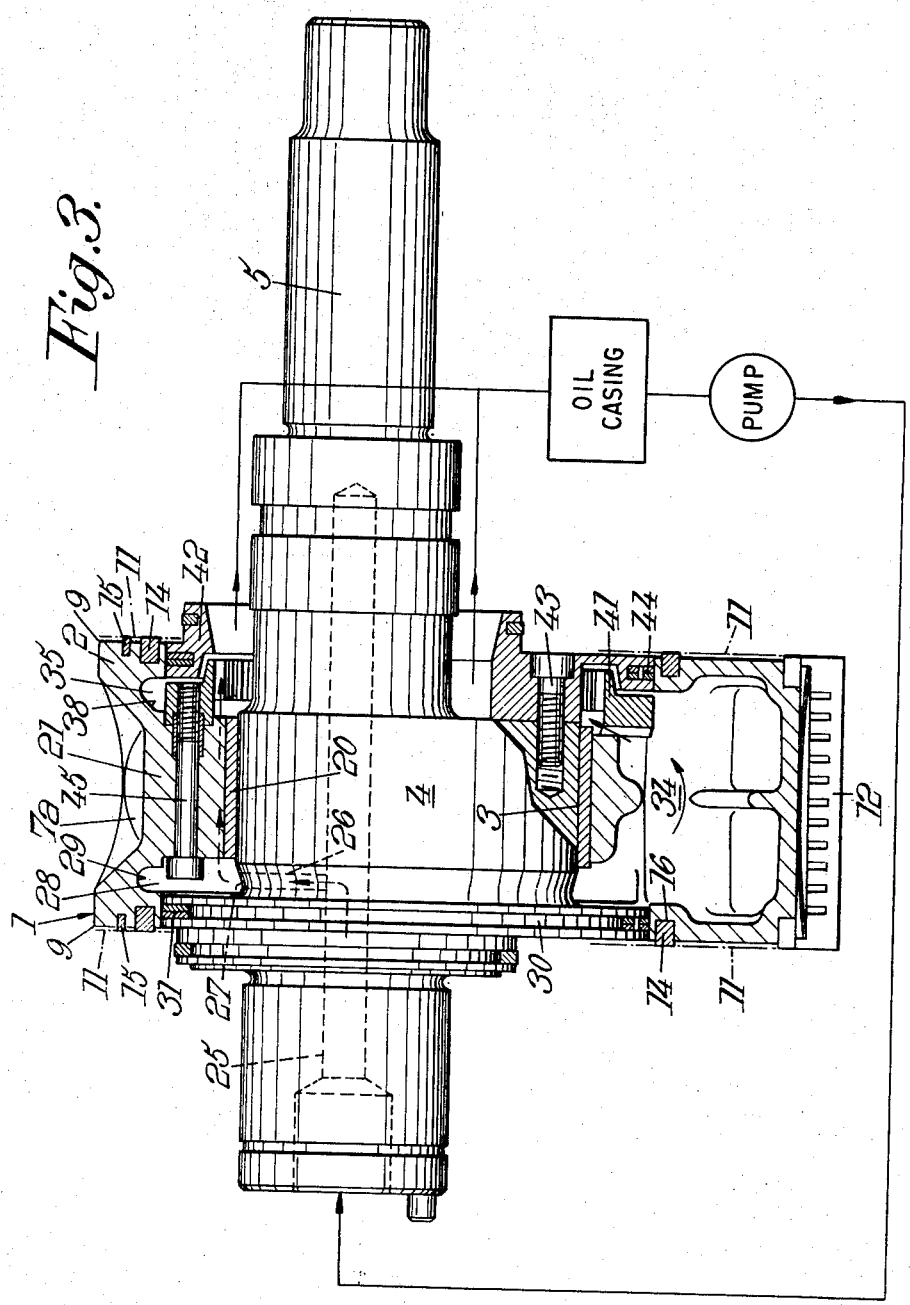

3,716,312
ROTORS FOR ROTARY PISTON ENGINES
Jean Panhard, Paris, France, assignor to Societe de Constructions Mecaniques Panhard & Levassor, Paris, France
Filed Mar. 23, 1971, Ser. No. 127,305
Claims priority, application France, Mar. 24, 1970, 7010479
Int. Cl. F02b 55/04
U.S. Cl. 418—94                                    5 Claims

ABSTRACT OF THE DISCLOSURE

The rotor is constituted by a body with a curvilinear triangular profile and rotates in a casing of a trochoidal shape. The curvilinear faces of the rotor have central recesses bounded by transverse crests parallel to the axis of the rotor shaft and by peripheral crests practically perpendicular to this axis. These recesses form variable volume combustion chambers with the engine casing being separated from one another by seals mounted along the transverse crests. The chambers are isolated radially by lateral segments on the sides of the rotor cooperating with the lateral surfaces of the casing. Between the bottoms of the recesses and the bore are closed cavities; below the crests are cavities communicating with the cooling circuit.

---

The invention relates to rotors, for rotary piston engines, constituted essentially by a body which is provided with cavities forming a circuit for the circulation of a cooling liquid and which is limited internally by a cylindrical bore intended to receive the eccentric of a drive-shaft and externally by a prismatic surface having faces with a convex profile, each of these faces being provided with a central recess, i.e. a recess reaching neither the transverse crests (or rectilinear edges parallel to the axis of the said shaft) nor the peripheral edges (i.e. the arched edges practically perpendicular to the said axis) of this face, each recess being adapted to limit, with the transverse surface of the casing of the engine, a respective one of the combustion chambers of variable volume which are separated from one another by seals mounted along the said transverse crests and which are isolated radially by lateral seals borne by the flanks of the rotor body to cooperate by contact with the lateral surfaces of the said casing.

As is known, such a rotor is kept at a suitable operating temperature by the circulation, in its cavities, of a cooling liquid which, being generally constituted by oil, can take part also in the lubrication of certain elements of the engine (ring of the eccentric and bearing rings of the drive-shaft, gears of the transmission, etc.). Hitherto, the cavities were distributed as uniformly as possible in the body so as to obtain homogeneous cooling.

However, applicant has noted that the best use of the engine is not obtained by homogeneous cooling of the rotor body but, on the contrary, by arranging so that certain parts thereof are at different temperatures more particularly adapted to the operating conditions of the elements which occur there.

It is an object of the invention to render these rotors such that the temperatures are therein distributed in a manner more favorable to the performance of the engine than hitherto.

To this end, the rotor according to the invention is characterised by the fact that its parts comprised between the bottoms of the recesses and the cylindrical bore are without cavities communicating with the circuit of the cooling liquid, whilst the rest of the rotor is provided with such cavities, particularly in the neighborhood of the transverse crests and peripheral edges. Preferably, the said parts of the rotor are provided with cavities which are obtained by casting with openings directed radially towards the inside and which have axially a width substantially equal to that of the bottom of the recesses, the said openings being closed by a force-fitted ring in the cylindrical bore of the body to form the bearing of the abovesaid eccentric.

In this way, the regions in the vicinity of the peripheral edges and of the transverse crests, where the abovesaid seals are situated, are well cooled by the liquid which circulates in the cavities of these regions, which enables the seals to slide freely in their housing under all conditions of operation of the engine and to be supported with efficiency on corresponding engaging surfaces of the casing. On the other hand, the parts of the rotor comprised between the recesses and the cylindrical bore are not directly cooled, which maintains, inside the combustion chambers, conditions favorable to good homogeneization and to complete and rapid combustion of the combustible gaseous mixture.

In order that the invention may be more fully understood, a preferred embodiment of a rotor according to the invention is described below purely by way of illustrative but non-limiting example with reference to the accompanying drawings, in which:

FIG. 1 shows from the front, with portions in section, one embodiment of a rotor constructed according to the invention, provided with its inner ring;

FIG. 2 is an axial section along the line II—II of FIG. 1 of the rotor without its ring;

FIG. 3 is an axial section along the line III—III of the rotor of FIG. 1, with its ring, to which the drive-shaft is adapted; and lastly.

Figure 4:
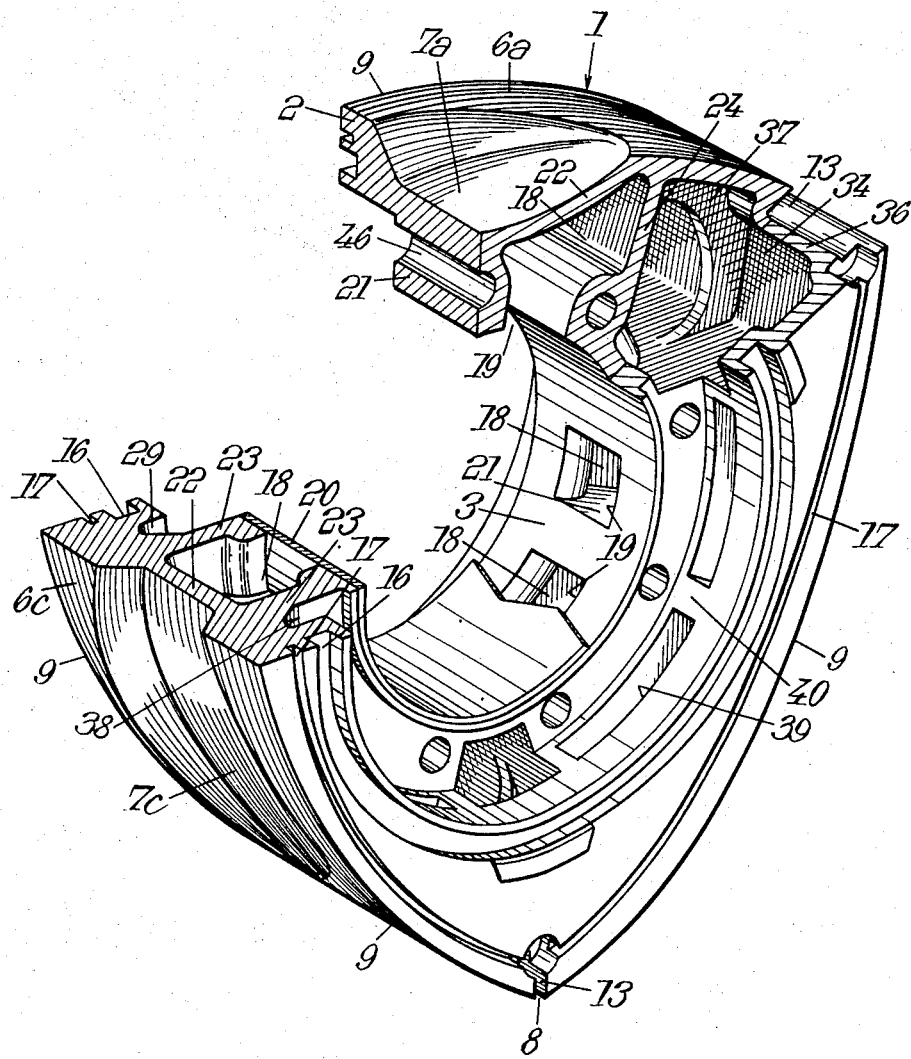
FIG. 4 shows in perspective with portions in section through various axial and transverse planes, the same assembly as in FIG. 1.

In the embodiment shown, the rotor 1 is constituted essentially by a body 2 which is provided with cavities forming a circuit for the circulation of the cooling liquid and which is limited, internally, by a cylindrical bore 3 intended to receive the eccentric 4 of a drive-shaft 5 and, externally, by a prismatic surface 6 having faces (three in number, according to the embodiment shown) 6a, 6b, 6c with convex profile. Each of these faces is provided with a recess or central hollow 7a, 7b, 7c not reaching the transverse edges 8 nor the peripheral crests 9 of this face. Each recess has an elongate shape and is extended, symmetrically or not, on both sides of that of the generators of the prismatic surface 6 which is situated at an equal distance from two consecutive crests 8.

Each face 6a, 6b, 6c is adapted to define, with the transverse or trochoidal surface 10 and with the lateral surfaces 11 of the engine casing, a respective combustion chamber of variable volume of which the cavity of the respective recess 7a, 7b, 7c forms part. These combustion chambers are separated from one another by segments 12 mounted in grooves 13 along the transverse crests 8 and they are isolated radially by lateral seals 14 and 15 borne by the flanks of the body 2 to cooperate by contact with the lateral surfaces 11 of the casing. Given that the latter is of well-known construction and has no direct relationship with the invention, it has not been shown in the figures, its wall surfaces 10 and 11 having alone been indicated in diagrammatic manner in FIGS. 1 and 3 respectively. The lateral seals 14 are seals of circular shape housed in the circular grooves 16 arranged respectively on the flanks of the body 2 and coaxial with the eccentric 4. As for the lateral seals 15, they are located, on each flank of the body, in grooves 17 positioned outside the groove 16 and along the sides of a curvilinear triangle substantially homothetic with the profile of the prismatic surface 6.

According to the invention, the parts of the body 2, comprised between the bottoms of the recesses 7a, 7b, 7c and the cylindrical bore 3, i.e. the part comprised radially with the dihedral angles A, B and C (FIG. 1) and axially between planes P and Q (FIG. 2), are devoid of cavities communicating with the circuit of the cooling liquid whilst the rest of the body 2 is provided with such cavities, in particular in the vicinity of the transverse crests 8 and peripheral edges 9. Preferably, the said parts of the cast body 2 are provided with cavities 18 which are formed during casting with openings 19, directed radially inwardly. These hollows have axially (see FIG. 2) a width substantially equal to that of the bottom of the recesses 7a, 7b, 7c, the said openings 19 being closed by a hard ring 20 force-fitted into the cylindrical bore 3 to form the bearing of the eccentric 4.

As can been seen in the figures, the body 2 comprises, within each dihedral angle A, B and C, two hollows 18 separated from one another by a full radial partition 21. Each hollow is limited radially, towards the outside, by a solid partition 22 forming the bottom of a recess such as 7a and, inwardly, by the ring 20; axially, each hollow is limited by two solid partitions 23 situated approximately in the planes P and Q respectively. In the circumferential sense, each hollow is limited not only by the separating partition 21 but also by a radial partition 24 situated approximately in one of the defining planes constituting the dihedral angles A, B and C.

As regards the cooling oil circuit, it is supplied by a pump (not shown) which delivers into a longitudinal channel 25 (FIG. 3) arranged in the shaft 5 and communicating with radial channels 26 which each open through an orifice 27 on the surface of the eccentric 4 spaced from the ring 20 and outside the space bounded by the planes P and Q (FIG. 2) and, for example, to the left of the plane P.

More specifically, the orifices 27 open inside an annular cavity 28 which is limited radially inwardly, by the eccentric 4 and, outwardly by the bottom of a groove 29 described in more detail below and axially, by the whole of the walls 23 and 21 and by a shoulder 30 of the shaft 5, coaxial with the eccentric 4 and provided with sealing elements 31. The groove 29 has an outer profile which follows roughly at a certain distance that of the faces 6a, 6b, 6c and possesses, from place to place discontinuities 32, separated by partitions 33 which extend radially inwardly and end at a distance from the surface of the eccentric 4, these discontinuities and partitions having the purpose of enabling the oil to come close to the faces 6a, 6b, 6c and the grooves 16 and 17 without the mechanical strength of the body 2 being threatened.

The annular cavity 28 communicates, through cavities 34 extending across the body 2, in the spaces external to the dihedral angles A, B and D with a similar annular cavity 35 situated to the right of the plane Q (FIG. 2). Each cavity 34 is bounded, in the circumferential sense, by two of the partitions 24 and, radially outwardly, by a partition 36 of which the outside constitutes the parts of the two faces 6a and 6b adjacent to a crest 8, a groove 13 being formed in this partition 36. A middle partial transverse partition 37 can unite the partition 36 with the neighboring partitions 24, as shown in FIGS. 1 and 4, with a view to stiffening the body 2. The cavity 35 is associated with a groove 38, discontinuities 39 and partitions 40 analogous respectively to the elements 29, 32 and 33 of the cavity 28. But, as a difference from the latter, the cavity 35 is open axially outwardly so as to allow the cooling oil to escape to enable it to lubricate a gear wheel 41 which belongs, in known manner, to the planetary gear mechanism of the engine. Moreover, a sleeve 42, also conventional, which is fixed to the eccentric 4 by means of screws 43, includes sealing members 44 cooperating with an inner edge of the body 2 so as to oblige the oil to pass over the teeth of gear 41 and over those of the hollow pinion (not shown) which cooperates with the latter. The gear wheel 41 is fixed to the body 2 by means of screws 45 which traverse the partitions 21 and 24 in holes 46 parallel to the axis.

The rotor described previously hence comprises a first annular cavity 28 which is supplied with liquid by channels 25, 26 and orifices 27 and a second annular cavity 35 which is united with the preceding one through cavities 34 axially traversing the body in the corners of the latter and opening at the level of the gears belonging to the rotor planetary gear mechanism.

The method of cooling this rotor is as follows.

The liquid, or more precisely the lubricating oil, whose path is indicated by the arrows in FIG. 3, arrives through the channels 25, 26 and the orifices 27 and penetrates into the first annular cavity 28 by passing inside the discontinuities 32, then it passes to the other side of the body 2 through cavities 34 and circulates inside the second cavity 35, whence it escapes by passing to the inside of the gear wheel 41 and thence to the oil casing and circulating pump (in known manner). The flanks of the body 2 are cooled at the level of the grooves 16, 17 by the liquid which circulates inside the cavity 28 and the discontinuities 32 and 39. It also cools the part neighboring the grooves 13 by passing into the cavities 34. Consequently, the regions neighboring the grooves 13 and the grooves 16 and 17 are well cooled, which enables the sealing elements 12, 14 and 15 to slide freely, whatever the operating conditions of the engine, and thus to ensure their sealing function. On the other hand, the parts of the rotor, comprised between the bottom of the recesses 7a, 7b, 7c and the bore 3, are not cooled since these parts are the sites of closed cavities 18 where the cooling liquid cannot circulate. The partitions 22 constituting the bottom of the recesses 7a, 7b, 7c are hence at a higher temperature than the rest of the rotor, which keeps the inside of the combustion chambers, of which these recesses form part, under conditions favorable for the obtaining of a good homogeneization of the gaseous fuel mixture and complete and rapid combustion of the latter.

As is self-evident and as emerges already from the preceding description, the invention is in no way limited to those of its methods of application, nor to those of its methods of production of its various parts, which have been more especially indicated; it encompasses, on the contrary, all variations.

I claim:

1. A rotor, for a rotary piston internal combustion engine, constituted essentially by a body which is provided with cavities forming part of a system for the circulation of a cooling liquid and which body is limited radially inwardly by a cylindrical bore for receiving the eccentric of a drive-shaft and radially outwardly by a prismatic surface having faces with a convex profile, each said face having transverse crests parallel to the axis of said shaft and axially spaced peripheral edges, a central recess being provided in each said face spaced from the respective transverse crests and peripheral edges, each said recess being adapted to define, with an engine casing, a combustion chamber of variable volume, said chambers being separated from one another by sealing elements mounted along said transverse crests and isolated radially by lateral sealing members borne by the sides of the rotor body to enable sealing contact with lateral surfaces in said casing, the parts of said rotor between the bottoms of the recesses and the cylindrical bore being devoid of cavities forming part of the cooling liquid system, whilst the other parts of the rotor are provided with such cavities, said rotor being constituted by a casting wherein said parts devoid of cooling liquid cavities are formed with openings directed radially inwardly and have an axial width substantially equal to that of the bottoms of said recesses, a hard ring being force-fitted into the cylindrical bore of the rotor body closing said openings and forming the bearing of said eccentric.

2. A rotor according to claim 1, wherein said cavities are provided in the neighbourhoor of said transverse crests and peripheral edges.

3. A rotor according to claim 2, comprising a first annular cavity adapted to be supplied with cooling liquid through channels connected to the delivery of a circulating pump, and a second annular cavity adapted to be united with said first annular cavity through passages traversing the body axially close to said transverse crests and opening at the level of a planetary mechanism to be driven by the rotor.

4. A rotor according to claim 1, wherein a first annular cavity is adapted to be supplied with cooling liquid through channels connected to the delivery of a circulating pump, and a second annular cavity is adaped to be united with said first annular cavity through passages traversing the body axially close to said transverse crests and opening at the level of a planetary mechanism to be driven by the rotor.

5. A rotary piston internal combustion engine comprising a rotor as claimed in claim 1, mounted on the eccentric of a drive-shaft, in the engine casing, and having its said cavities connected to a cooling liquid circulating pump.

References Cited

UNITED STATES PATENTS

| | | | |
|---|---|---|---|
| 3,112,870 | 12/1963 | Bentele | 418—91 X |
| 3,269,370 | 8/1966 | Paschke et al. | 418—94 X |
| 3,206,109 | 9/1965 | Paschke | 418—91 X |
| 3,059,585 | 10/1962 | Froede et al. | 418—91 X |
| 3,102,682 | 9/1963 | Paschke | 418—91 |
| 3,444,842 | 5/1969 | Bensinger et al. | 418—91 X |
| 3,445,058 | 5/1969 | Bensinger | 418—91 X |

ALLAN D. HERRMANN, Primary Examiner

U.S. Cl. X.R.

123—8.01